Patented Sept. 15, 1936

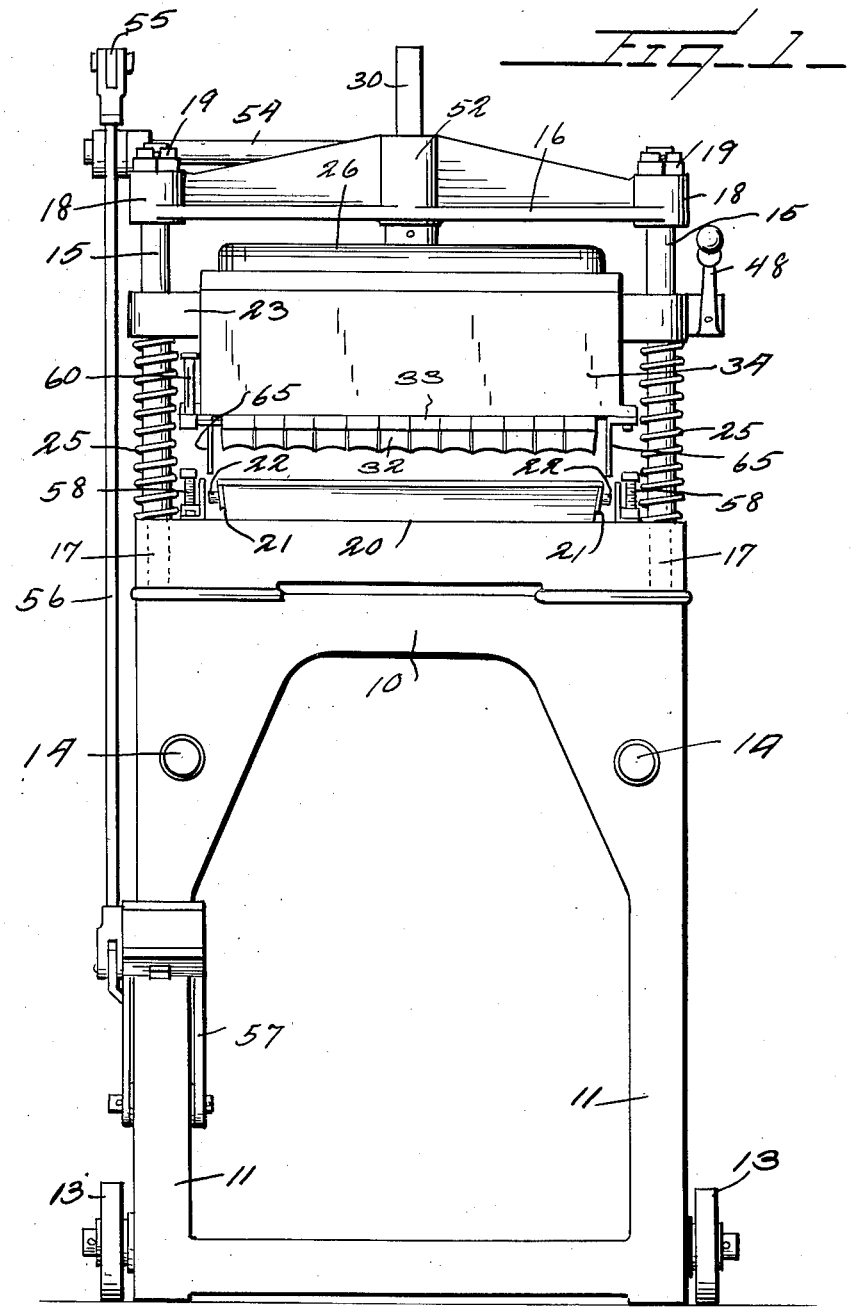

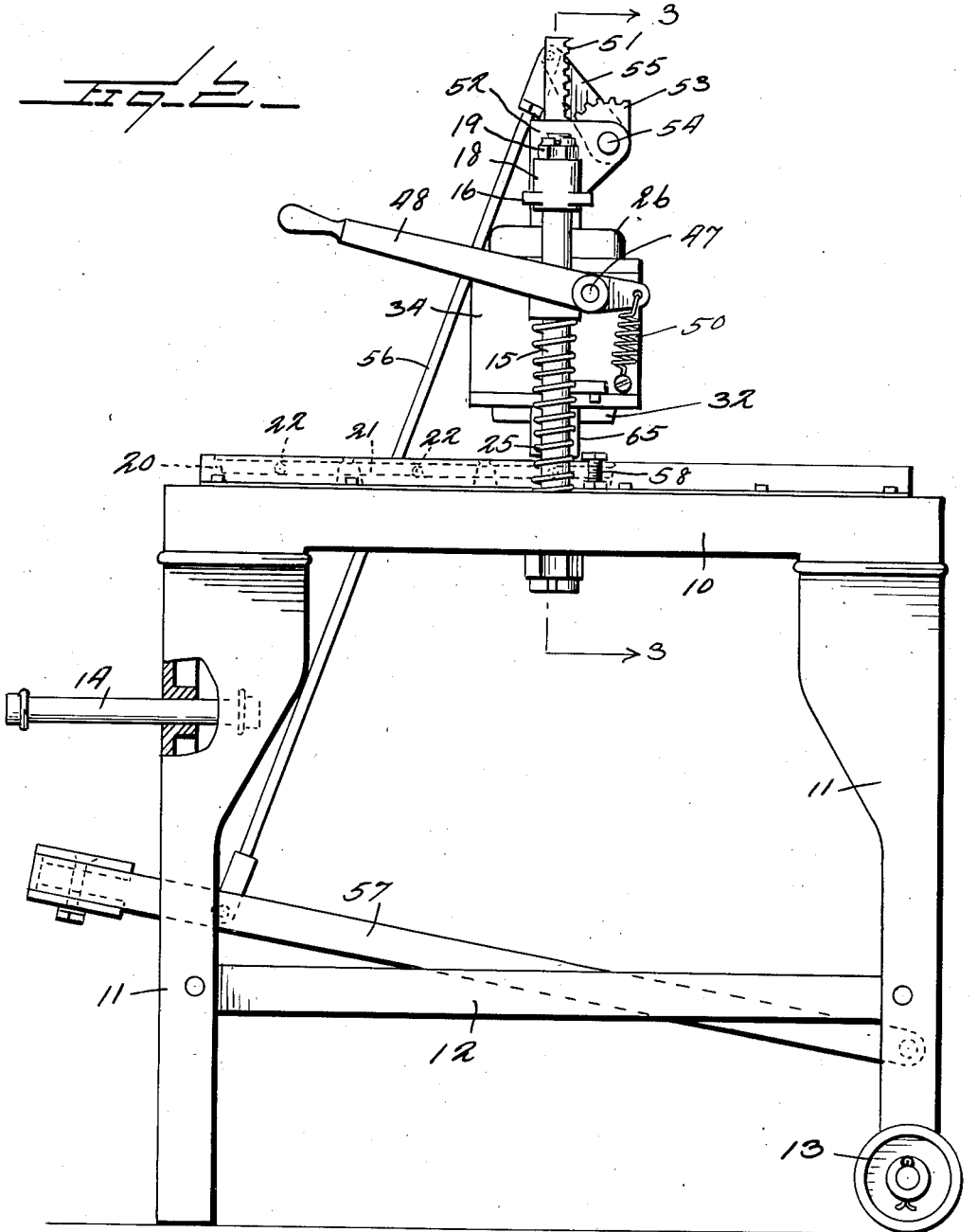

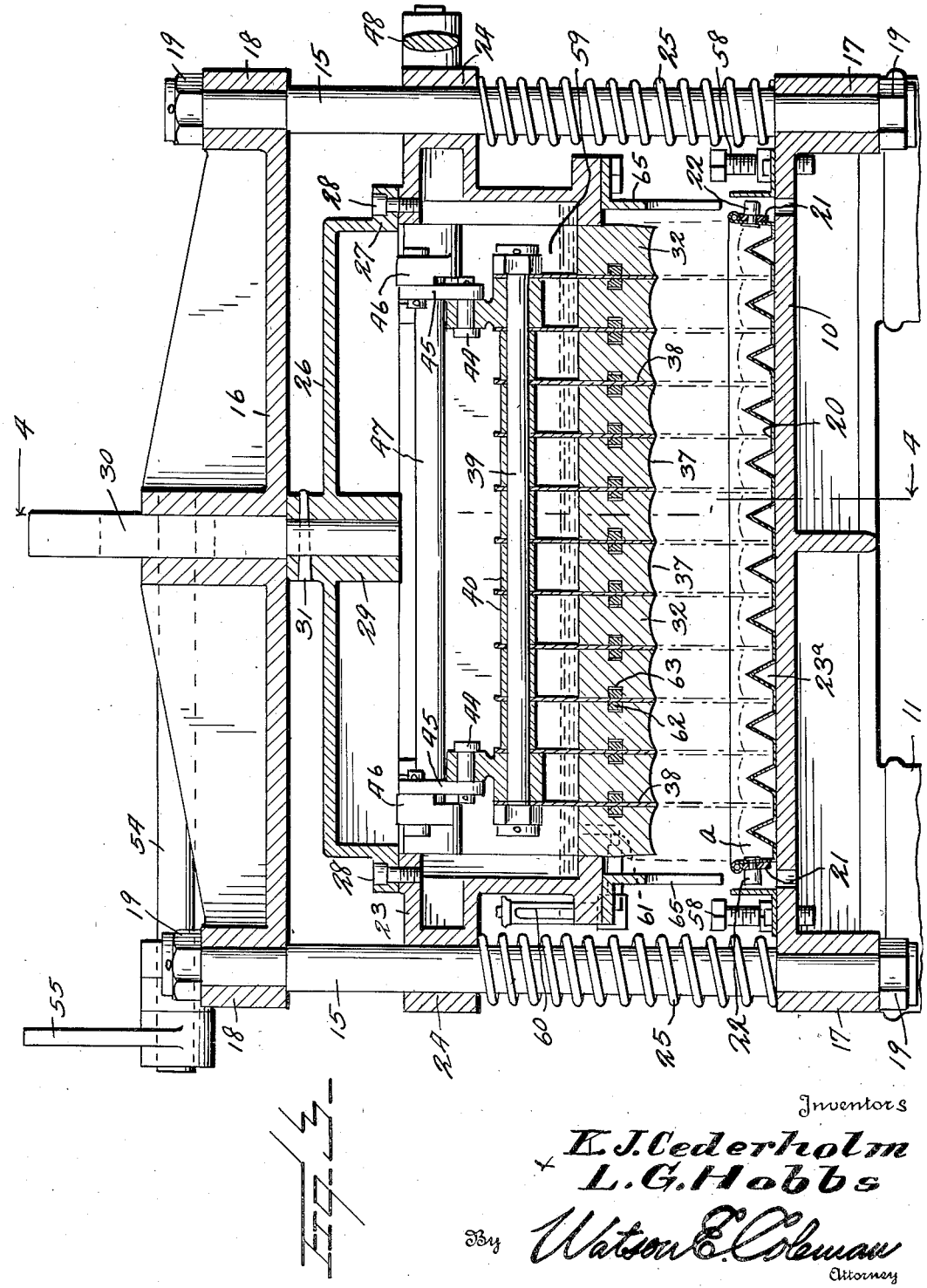

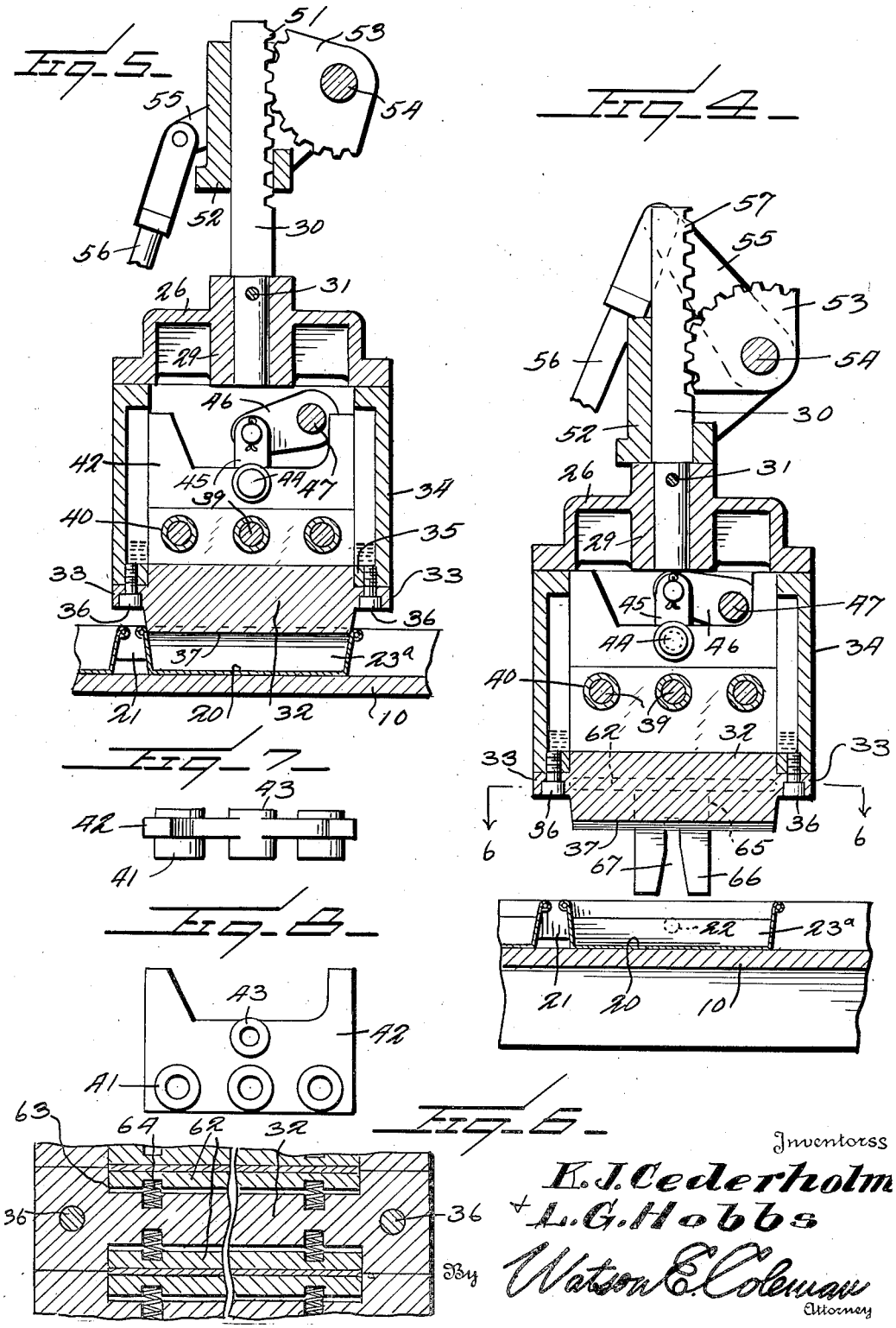

2,054,720

UNITED STATES PATENT OFFICE 2,054,720

APPARATUS FOR FORMING ROLLS

Knute J. Cederholm and Laurence G. Hobbs, Fitchburg, Mass.

Application August 22, 1933, Serial No. 686,276

5 Claims. (Cl. 107—21)

This invention relates to devices for forming and pans for baking rolls and the general object of the invention is to provide means whereby rolls may be formed from dough and afterwards baked, which rolls will be provided with a longitudinally extending recess into which a filling may be disposed and the roll closed upon the filling, thus doing away with the necessity of slicing a roll longitudinally for the insertion of the filling, which slicing action, as it does not remove any of the roll itself, causes the roll to bulge out unduly and takes away from the daintiness of the sandwich so formed and makes it difficult to handle.

A further object is to provide a machine of this character including a pan in which the rolls are afterwards baked, this pan having a wall which is formed with a series of V-shaped projections which will cause the dough molded and the rolls eventuating therefrom to be formed with a hollow or recess which may be afterwards filled with any filling material desired.

A further object is to provide a machine of this character having a plurality of cutting knives and a dough presser, the knives operating through slots in the dough presser and acting to either entirely or partially separate the rolls from each other in the pan, and a further object in this connection is to provide means whereby these knives may be oiled and the surplus oil removed automatically.

Another object is to provide means whereby the pans may be properly centered with relation to the cutting knives and dough presser.

A further object is to provide a machine of this character which will eliminate rolls so irregular in shape that they cannot be served and provide a machine in which the dough presser block is brought to a fixed position and the knives are movable therethrough so that the presser block forms the dough before the knives cut it into separate rolls, the presser block acting to uniformly distribute the dough within the pan and another object is to provide means for limiting the descent of the dough presser block and of the knives, which means is adjustable and to provide a machine which is particularly easy to assemble and as easily taken down for cleaning purposes and repairs.

Other objects will appear in the course of the following description.

Our invention is illustrated in the accompanying drawings, wherein:—

Figure 1 is a front elevation of a machine constructed in accordance with our invention;

Figure 2 is a side elevation of the machine shown in Figure 1;

Figure 3 is an enlarged section on the line 3—3 of Figure 2;

Figure 4 is a vertical section on the line 4—4 of Figure 3;

Figure 5 is a like view to Figure 4, showing the dough pressing block lowered and knives lowered;

Figure 6 is a section on the line 6—6 of Figure 4;

Figure 7 is a top plan view of one of the knife holders;

Figure 8 is a side elevation thereof;

Referring to these drawings, 10 designates the table of the machine which is provided with the legs 11 and suitable braces 12. The rear legs are provided with the rollers 13 and the front of the machine as shown in Figure 1 is provided with two handles 14 shiftable fully inward or fully outward by which the machine may be lifted and trundled to the desired position.

The table 10 is provided at its ends with upwardly extending posts 15. these posts being connected at their upper ends by means of a transversely extending yoke 16. The table 10 has relatively deep hubs 17 through which the bolts pass while the yoke 16 has relatively deep sleeves or collars 18 through which the upper ends of the posts pass. Nuts 19 engage against these sleeves or collars 18 and hold the posts in place and the yokes 16 in spaced relation to the table.

Adapted to be disposed upon the table between the posts is a pan 20 or more properly speaking a plurality of pans, as for instance, three pans, linked together by longitudinally extending links 21, either rigidly or detachably connected to the side wall of each pan. There are two of these links, one on each side of the sets of pans and holding the pans in rigid engagement with each other so that three pans may be inserted in the machine and removed, or these three pans carried to an oven for baking the rolls. We do not wish to be limited to the use of a plurality of pans linked to each other, as obviously the pans need not be so linked.

It is to be noted that the link 21 is shown in Figure 3 as being connected with the pan by a rivet having an outwardly projecting circular portion 22 which acts as will be later stated to properly center the pans.

Mounted upon the posts 15 for vertical movement is a frame 23 through the ends of which the posts pass as at 24. Springs 25 surrounding the posts and bearing against the table 10 act to force this frame 23 upward. The frame is closed at its upper end by means of a plate 26 having the downwardly extending flanges 27 which are attached to the frame 23 by screws 28. This plate 26 has a central elongated hub 29 to which the lower end of a plunger 30 is attached as, for instance, by means of the key 31 or in any other suitable manner.

Disposed in the open lower end of the frame 23 are a series of dough pressing blocks 32. These blocks, as shown in Figures 4 and 5 at their ends are each provided with the outstanding flanges 33 while the lower end of the side walls 34 of the frame 23 have inwardly extending flanges 35, screws 36 extending through the flanges 33 and into the flanges 35. The under face of each block 32 is curved concavely as at 37. Adapted to extend through the spaced blocks 32 are the knives 38. These knives are supported by three longitudinally extending bolts 39 which pass through the upper ends of the knives, the knives being supported on these bolts by spacing sleeves 40. The extremities of the bolts 39 are received within the flanged openings 41 of the bolt supporting plates 42 shown in Figures 7 and 8. Each plate has adjacent its upper edge a flanged opening 43 for the reception of a wrist pin 44. These wrist pins 44 are carried by links 45 which in turn are pivotally mounted upon the extremities of arms 46 in turn mounted upon the shaft 47, which shaft, as shown in Figure 2, carries upon it at one end, the handle 48 so that the shaft may be rocked, the downward movement of the handle being resisted by the coiled contractile spring 50 as shown in Figure 2. It will thus be seen that when the shaft 47 is rocked by hand, the knives will be depressed and upon release of the handle 48, spring 50 will return the knives to their raised position. It will likewise be seen that the shaft 47 is mounted upon the frame or casing 23 so that the knives, the operating shaft therefor and the handle all descend when the frame 23 is depressed, and vice versa. The frame 23 is depressed by means of the plunger 30 previously adverted to. This plunger, as shown in Figure 5 is provided with the rack teeth 51, the plunger passing through a fixed collar 52 formed to embrace the plunger 30 and slotted on one side to accommodate a sector gear 53 carried on the shaft 54, the shaft having an arm 55 connected by a link 56 to a treadle 57 or like instrumentality so that as this treadle is depressed, the plunger will be depressed. The degree of depression capable of being given to the plunger is limited by means of the limiting screws 58 shown in Figure 3 which are disposed beneath the flanges 33 projecting from the ends of the frame 23. These screws are, of course, adjustable so that the degree of depression given to the plunger may be adjusted.

The frame 23 provides an oil pan designated generally 59, the bottom of which is constituted by the blocks 32 and intermediate knives and this pan is designed to be filled more or less with an oil such as a vegetable oil for the purpose of lubricating the knives 38. Suitable means are provided for filling this pan with oil and a gage 60 is shown in Figure 3 to indicate the extent to which the pan is filled.

A drainage opening 61 closed by a suitable plug may be used for removing excess oil or removing oil from the oil pan when the machine is out of use to prevent the oil from becoming rancid. The excess oil is wiped off of the knives by means of the wipers 62 which are disposed in recesses 63 formed in the sides of the pressing blocks 32, these wipers being forced toward each other and against the faces of the blades by means of springs 64.

The most important features in one sense of this machine and the feature with which all other features particularly coact is the pan 20. This pan as shown in Figure 3 is formed with a series of upwardly extending V-shaped projections 23a and the pan is so disposed upon the table 10 that the knives 38 will extend downward into the pan each between two of these projections. The knives may be adjusted or rather the length of the stroke may be so adjusted that the knives will cut entirely to the bottom of the pan or to any desired distance from the bottom of the pan so that the rolls a shown in dotted lines in Figure 3 are partially or wholly separated from each other depending upon the distance of the stroke desired and employed by the operator of the machine.

The pressing blocks 32 move downward to a position immediately above the upward projections 23a or, in other words, to the dotted lines shown in Figure 3, as indicating the upper surface of the formed dough and thus force the dough which has been placed in the pan downward and equalize this dough throughout the entire pan and form the dough so as to give a rounded surface to the top of the dough, the height of the formed dough being determined by position of limiting screws 58.

Obviously, the shape of the under faces of these pressing blocks 37 may be varied and the exact shape of the projections 23a may be varied so as to form a roll of any desired configuration.

For the purpose of centering the pan 20 so that the blocks 32 and the knives 38 move downwardly exactly into the pan, that is, in the manner shown in Figure 5, we provide the centering means shown in Figures 3 and 4 and comprising the laterally disposed plates 65 which are vertically slotted to provide the two guide fingers 66 defining the slots 67, the walls of which extend upward and inward and then straight upward, snugly embracing the laterally projecting pins 22 previously referred to. Thus if a pan is slightly out of the proper position, the inclined lower edges of the fingers will shift the pan to properly center it upon the descent of the plunger and if the pan is entirely out of position, the lower ends of the fingers 66 will contact with these pins 22 and entirely prevent the descent of the plunger.

After the dough has been formed and pressed into these pans, and the rolls partially or wholly separated, from each other, the three pans are taken to the oven for baking, the oil deposited by the knives preventing the adherence of the rolls to each other after they have been baked where they have been cut apart.

As before stated, while we have shown three pans rigidly linked to each other and adapted to be disposed in one, two, three order, beneath the pressing blocks and knives, we do not wish to be limited to this, as pans may be put in one at a time, or in any desired order.

The operation will be obvious from what has gone before. The pans are filled with the necessary amount of dough. The pans are then successively disposed beneath the presser and cutter, the treadle 57 is depressed to cause the descent of the plunger with the knives still raised and the presser blocks, under these circumstances, equalize the dough over the entire pan and press it into desired shape and then the operator depresses the handle 48, causing the depression of the cutting knives to the extent permitted by the adjustment of the machine to partially or entirely separate the rolls from each other and to cause the knives to deposit a film of oil, grease or other material recognized in the art as suitable to facilitate the easy and accurate separation of the rolls after baking.

This machine while previously referred to as being operated by foot and hand, may, by the use of a series of cams, or other recognized mechanical appliances, be transferred into a power operating machine.

While the foregoing description and specifications describe a means of making sandwich rolls, it can be clearly understood by those skilled in the art that all other sorts of doughs and batters can be processed by this machine or pan.

We claim:—

1. A machine for forming rolls comprising a table, posts mounted upon the table, a frame having four vertical walls and slidingly mounted upon the posts, springs urging said frame upward, manually operable means for depressing the frame, means extending upward from the table and adjustably limiting the downward movement of the frame, a series of pressing blocks detachably supported upon said frame and forming the bottom thereof, the pressing blocks and the frame together defining an oil containing chamber, a series of knives disposed between the pressing blocks and extending into the chamber, bolts connecting all of said knives, spacing sleeves surrounding the bolts, a shaft mounted in said frame for oscillation and having arms operatively connected to said bolts, and means exterior to the frame but movable therewith whereby the shaft may be rocked to depress the knives.

2. A machine for forming rolls comprising a table, posts mounted upon the table, a frame having four vertical walls and slidingly mounted upon the posts, springs urging said frame upward, manually operable means for depressing the frame, means extending upward from the table and adjustably limiting the downward movement of the frame, a series of pressing blocks detachably mounted upon said frame and forming the bottom thereof, the pressing blocks and the frame together defining an oil containing chamber, a series of knives disposed between the pressing blocks and extending into the chamber, bolts connecting all of said knives, spacing sleeves surrounding the bolts, a shaft mounted in said frame for oscillation and having arms operatively connected to said bolts, means exterior to the frame but movable therewith whereby the shaft may be rocked to depress the knives, and means extending downward from the frame at opposite ends thereof and engaging a baking pan to center it upon the table.

3. Mechanism for forming rolls comprising a table, posts mounted upon the table, a frame having four vertical walls slidingly mounted upon the posts, means urging said frame upward, manually operable means for depressing the frame, a series of pressing blocks detachably mounted in said frame and forming the bottom thereon, the pressing blocks together with the walls of the frame defining an oil containing chamber, a series of knives disposed between the pressing blocks and extending into said oil containing chamber, a shaft mounted in said frame for oscillation, means operatively connecting all of said knives, said means having upwardly extending ears, the shaft having arms pivotally connected to the upwardly extending ears, means exterior to the frame but carried thereby and movable therewith whereby the shaft may be rocked to depress the knives, and means disposed between the blocks for wiping against said knives.

4. A machine for forming rolls comprising a table, guide posts mounted upon the table, a rectangular frame having four vertical walls and slightly mounted upon posts, a cover detachably connected to and extending over said frame, a manually operatable plunger operatively connected to the cover, a series of pressing blocks forming the bottom of the frame and detachably connected thereto, the pressing blocks and the frame together forming an oil containing chamber, a series of knives disposed between the pressing blocks and reciprocatable therebetween, the knives normally having their lower edges coincident with the lower faces of the pressing blocks and extending upward into the oil containing chamber, means entirely within the oil chamber connecting all of said knives for common movement, a shaft mounted in the frame for oscillation and having arms operatively connected to said knife connecting means, and means carried by the frame and movable therewith whereby the shaft may be rocked to depress the knives.

5. A machine for forming rolls including a table, a frame having four vertical walls mounted upon said table for vertical movement, springs urging the frame upward, manually operable means for depressing the frame toward the table, a series of pressing blocks detachably supported within said frame and forming the bottom thereof, the pressing blocks and the walls of the frame defining an oil containing chamber, a series of spaced knives disposed between the pressing blocks and extending into the chamber, the pressing blocks having recesses above their lower surfaces confronting the knives, wiping strips disposed in said recesses and resiliently urged against the knives, means connecting all of said knives for common movement, and means carr'ed by said frame whereby said knives may be depressed independently of the depression of the frame to force the knives beyond the blocks.

KNUTE J. CEDERHOLM.
LAURENCE G. HOBBS.